(12) United States Patent  
Gopshtein et al.

(10) Patent No.: US 9,660,924 B2
(45) Date of Patent: May 23, 2017

(54) DETERMINING A MAXIMAL SIZE OF PACKETS

(75) Inventors: Michael Gopshtein, Yahud (IL); Eyal Kenigsberg, Dolev (IL); Rotem Steuer, Modiin (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 810 days.

(21) Appl. No.: 13/447,510

(22) Filed: Apr. 16, 2012

(65) Prior Publication Data

US 2013/0272301 A1  Oct. 17, 2013

(51) Int. Cl.
*H04L 12/805* (2013.01)
*H04L 12/801* (2013.01)

(52) U.S. Cl.
CPC .............. *H04L 47/36* (2013.01); *H04L 47/17* (2013.01); *H04L 47/193* (2013.01)

(58) Field of Classification Search
None
See application file for complete search history.

(56) References Cited

U.S. PATENT DOCUMENTS

| | | | |
|---|---|---|---|
| 6,249,530 B1* | 6/2001 | Blanco et al. | 370/468 |
| 7,542,471 B2 | 6/2009 | Samuels | |
| 7,738,495 B2 | 6/2010 | Dalal | |
| 7,920,481 B2 | 4/2011 | Winter | |
| 7,978,681 B2 | 7/2011 | Chung | |
| 7,995,478 B2 | 8/2011 | Takeda | |
| 2002/0174216 A1* | 11/2002 | Shorey et al. | 709/224 |
| 2005/0013246 A1* | 1/2005 | Miyake et al. | 370/230 |
| 2006/0083231 A1* | 4/2006 | Jeffay et al. | 370/389 |
| 2007/0143598 A1* | 6/2007 | Partridge et al. | 713/160 |
| 2008/0101382 A1 | 5/2008 | Bannerjee | |
| 2008/0212480 A1* | 9/2008 | Shimonishi | 370/236 |
| 2011/0228697 A1* | 9/2011 | Yano | H04L 1/1635 370/253 |
| 2012/0133593 A1* | 5/2012 | Nakayama et al. | 345/173 |
| 2012/0300650 A1* | 11/2012 | Claudius | 370/252 |

\* cited by examiner

*Primary Examiner* — Marcus R Smith
*Assistant Examiner* — Saba Tsegaye
(74) *Attorney, Agent, or Firm* — Trop, Pruner & Hu, P.C.

(57) ABSTRACT

Packets from a first network entity to a second network entity are received. A maximal size of packets from the second network entity to the first network entity is determined based on information in the received packets.

12 Claims, 3 Drawing Sheets

DETERMINING A MAXIMAL SIZE OF PACKETS

BACKGROUND

Data between network entities can be communicated in packets, such as packets according to the Transmission Control Protocol (TCP). A network path between network entities through which packets are communicated can be associated with a packet maximal size, which is a maximum size of data that is supported by the network path.

BRIEF DESCRIPTION OF THE DRAWINGS

Some embodiments are described with respect to the following figures.

DETAILED DESCRIPTION

Figure 1:
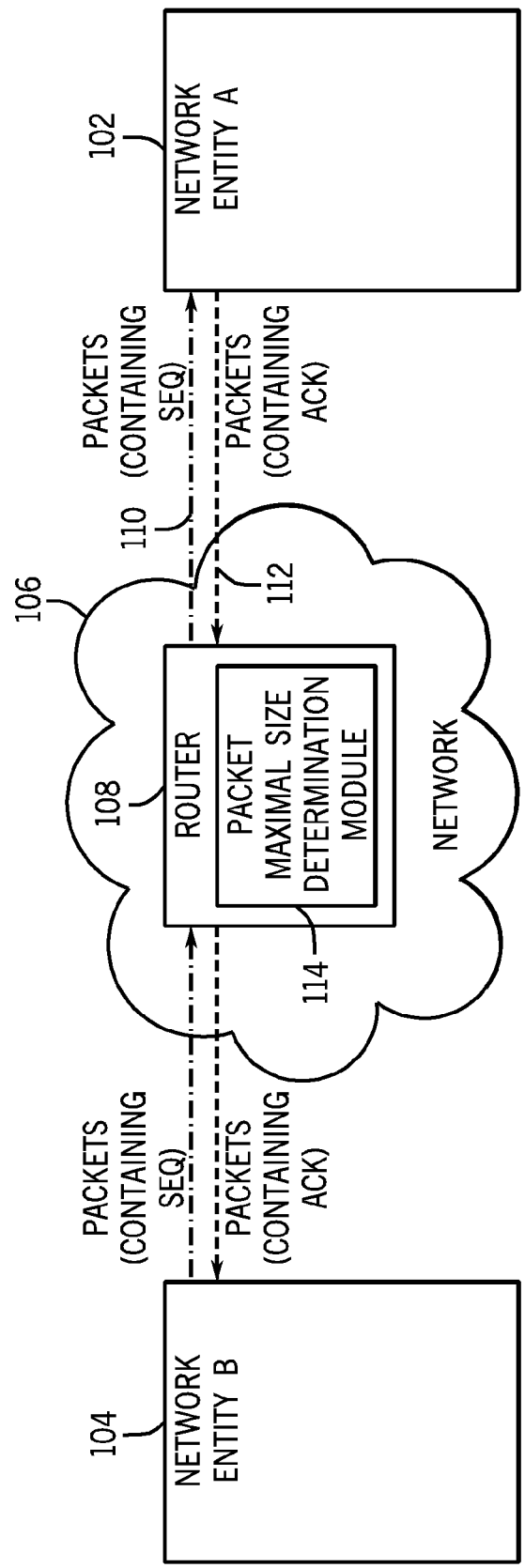
FIG. 1 is a block diagram of an example arrangement that includes a packet maximal size determination module according to some implementations.

In some network arrangements, a network monitor can be used to monitor packets that are communicated through a network path. The monitoring can be performed in a non-intrusive manner by copying the detected packets on the network path. The network monitor can analyze the monitored copies of packets for various purposes, including the estimation of packet maximal size for a particular connection between network entities. By looking at the copies of the packets that are captured by the network monitor, packet sizes of the packets can be compared, and a largest packet size from among these packet sizes can be used as an estimate of a packet maximal size.

In some cases, the network monitor can monitor packets in just one direction (e.g. from network entity A to network entity B), but is unable to monitor traffic in the reverse direction, from network entity B to network entity A. The inability to monitor traffic in both directions between network entity A and network entity B can be due to misconfiguration of communication equipment (e.g. a switch, a router, etc.) in a network such that the network monitor is able to monitor traffic in just one direction. Alternatively, network traffic from network entity A to network entity B can proceed along a first network path, but network traffic in the reverse direction (from network entity B to network entity A) can proceed along a second, different network path. In the latter situation, a network monitor can monitor traffic along just one of the network paths, but not along the other network path.

If a network monitor is unable to determine the packet maximal size in both directions in communications between network entities, then the network communication performance in the direction for which the packet maximal size cannot be ascertained may suffer.

As noted above, a packet maximal size can refer to a larger size of a packet that is allowed to be communicated through a network path. In some examples, a packet maximal size can refer to a larger size of a packet that can be communicated along a network path without fragmentation. Fragmentation refers to dividing a packet into multiple smaller packets, where each of the smaller packets has a size that is less than the packet maximal size. If the packet maximal size along a particular direction is unknown, then a source network entity may attempt to send packets that exceed the packet maximal size, which can result in such packets being rejected in the network, or can result in fragmentation of the packets.

In some implementations, network entities can employ TCP/IP (Transmission Control Protocol/Internet Protocol) for communicating packets. IP refers to a communications protocol for relaying (routing) packets across a network using addresses of a source network entity and destination network entity. TCP is a transport protocol for reliably communicating packets across a network. In implementations where TCP is used for communicating data between network entities, a "packet" can refer to a TCP segment, where a TCP segment can refer to a unit of information that TCP uses to communicate data. A TCP segment can include a segment header and a payload data section, where the payload data section is used to carry actual data, and the header contains control fields.

In the ensuing discussion, although reference is made to TCP and control fields carried in TCP headers, it is noted that techniques or mechanisms according to some implementations can also be applied to other communication protocols. If other protocols are used, a "packet" can refer generally to a unit of data, where such unit of data can include a header and a payload data section.

In implementations where TCP is used, the packet maximal size can refer to either a maximum transmission unit (MTU) size or a maximum segment size (MSS). The MTU size is the size (in bytes) of the largest amount of data that can be communicated along a network path. The MSS is derived from the MTU size—the MSS can be equal to the MTU size plus a size used for communicating one or multiple headers, including a TCP header, IP header, and any other header (e.g. Ethernet header).

In accordance with some implementations, techniques or mechanisms are provided that allow for estimation of a packet maximal size of packets along a particular network path without the use of a network monitor that is able to directly monitor packets (or copies of the packets) for the particular network path from a first network entity to a second network entity.

FIG. 1 is a block diagram of an example arrangement that depicts two network entities 102 and 104 interconnected by a network 106. In the ensuing discussion, the network entity 102 is referred to as "network entity A," and the network entity 104 is referred to as "network entity B."

In examples according to FIG. 1, the network 106 has a router 108, which is used to route packets between the network entity A and network entity B. Although just one router 108 is shown, the network 106 can include multiple routers that are interconnected by links in the network 106.

As further shown in FIG. 1, network entity A can send packets through the network 106 in a first direction represented by arrow 112. Network entity B can send packets through the network 106 in the reverse direction represented by arrow 110. Although the packets in the directions 110 and 112 are depicted as traversing through the same router 108, it is noted that in other examples, the packets in the direction 110 can traverse a first network path (including at least a first router), while the packets along direction 112 can traverse a separate network path (including at least a second, different router).

In the ensuing discussion, it is assumed that a network monitor is not available that is able to directly monitor packets (or copies of the packets) in communications from network entity B to network entity A (along direction 110). As a result, the estimation of a packet maximal size for communications along direction 110 cannot be based on observation of packets (or copies of packets) in direction 110.

In some examples, a network monitor may be available to directly monitor packets (or copies of the packets) in communications from network entity A to network entity B (along direction 112). However, use of such a network monitor can be omitted in other examples.

In to some implementations, a packet maximal size determination module 114 in the router 108 can be used for estimating a packet maximal size of packets along the direction 110 from network entity B to network entity A. In other examples, the packet maximal size determination module 114 can be located elsewhere, such as in a controller of the network 106, in networking entity B, or in some other device.

In accordance with some implementations, the estimate of a packet maximal size of packets along the direction 110 (from network entity B to network entity A) is based on information of packets along the reverse direction 112 (from network entity A to network entity B). More generally, the estimate of a packet maximal size of packets along a first direction between network entities can be based on information in packets communicated along a reverse direction entity between the same network entities. Examples of information that can be used for estimating a packet maximal size according to some implementations are discussed further below.

In implementations that employ TCP, a TCP header of a TCP packet (also referred to as a TCP segment) can include a sequence number, which according to TCP is a number used to identify a byte of data. Respective bytes of data are associated with respective sequence numbers. The sequence numbers are cumulative sequence numbers, since the sequence numbers are progressively increased as additional bytes of data are sent from a source network entity to a destination network entity. Associating sequence numbers with bytes allows a destination network entity to properly order the bytes according to the sequence numbers.

According to TCP, in a TCP packet, the sequence number included in the TCP header identifies the first byte of the payload data section of the TCP packet. Note that even if the payload data section of the TCP packet includes multiple bytes, there would just be one sequence number in the TCP header. However, if a first TCP packet has multiple bytes in the payload section of a first TCP packet, then the sequence number in the TCP header of a second TCP packet (sent immediately following the first TCP packet) would be incremented by the number of bytes that are in the payload section of the first TCP packet. For example, assume the sequence number of the first TCP packet is 100, and the first TCP packet has four bytes in its payload section. In such example, the sequence number in the TCP header of the second TCP packet would be set to 104, which is four greater than the sequence number in the TCP header of the first TCP packet.

As depicted in FIG. 1, the packets sent from network entity B to network entity A along direction 110 contains sequence numbers (represented as "SEQ"). To provide for reliable communication of packets, TCP also defines an acknowledgement mechanism, where a destination network entity can acknowledge receipt of packets sent by a source network entity. This can be accomplished by including an acknowledgement number in a TCP header. An acknowledgement number in a TCP header acknowledges receipt of all prior bytes, and is set equal to the next sequence number that the destination network entity is expecting from the source network entity. TCP uses a cumulative acknowledgement technique, where the destination network entity acknowledges sequence numbers that have been received so far. For example, if a source network entity sends a TCP packet containing four bytes, and a sequence number 100 is included in the TCP header, then the destination network entity would treat the four bytes as having sequence numbers 100, 101, 102, and 103. The destination network entity returns to the source network entity a packet having an acknowledgment number of 104, which is the sequence number of the next byte expected by the destination network entity from the source network entity. In FIG. 1, acknowledgement numbers are represented by "ACK" in the packets sent from network entity A to network entity B along direction 112.

Although reference is made to acknowledgement numbers that acknowledge receipt of sequence numbers in TCP packets, it is noted that, more generally, packets sent from network entity A to network entity B can include "index numbers," where an index number provides a relative index of data received from the source network entity. The relative index of data received from the source network entity refers to an indicator that is progressively increased as additional data portions are received from the source network entity.

In the ensuing discussion, references made to estimating a packet maximal size based on acknowledgement numbers. However, in other implementations, the estimate of a packet maximal size can be based on other types of index numbers.

The difference between acknowledgment numbers in two successive packets (from network entity A to network entity B) that acknowledge corresponding packets (from network entity B to network entity A) provides an indication of an amount of data that was received by network entity A in one or multiple packets from network entity B. Two successive packets can refer to two packets that are received one after another by a network entity.

As an example, network entity B may have sent packet 1 followed by packet 2 to network entity A (along direction 110). Note that it may be possible that there is zero or more packets sent from network entity B to network entity A between network packets 1 and 2. In response to packet 1, network entity A sends to network entity B packet X having acknowledgment number ACK1, and in response to packet 2, network entity A sends to network entity B packet Y having acknowledgment number ACK2. The difference between ACK2 and ACK1 provides an indication of an amount of data received by network entity A from network entity B between packets 1 and 2.

Note that such amount of data may be included in one packet, or multiple packets. As a result, the amount of data indicated by the difference between acknowledgement numbers in successive packets sent from network entity A to network entity B is not used as a direct estimate of the packet maximal size. However, the packet maximal size determination module 114 can determine differences between acknowledgement numbers in corresponding multiple pairs of successive packets sent from network entity A to network entity B (in direction 112), and these multiple differences can be used for estimating the packet maximal size of packets in the direction 110 from network entity B to network entity A.

Figure 2:
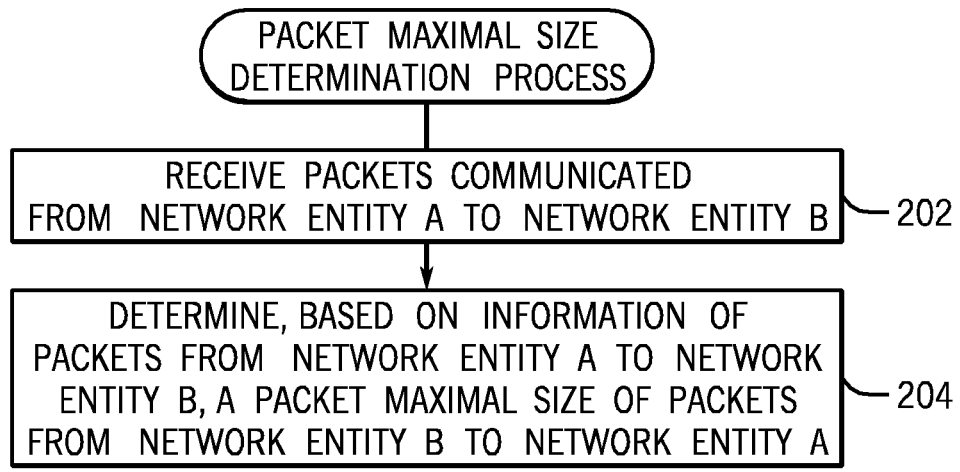
FIGS. 2 and 3 are flow diagrams of processes of determining a packet maximal size, according to some implementations.

FIG. 2 is a flow diagram of a process of determining a packet maximal size according to some implementations. This process of FIG. 2 can be performed by the packet maximal size determination module 114, in some examples. The process receives (at 202) packets communicated from network entity A to network entity B. The packets received can be the actual packets sent from network entity A to network entity B, or the packets received can be copies of the packets sent from network entity A to network entity B. For example, a network monitor may be used to obtain copies of packets from network entity A to network entity B. In other examples, other entities can be used to obtain packets (or copies of packets) from network entity A to network entity B. Examples of such other entities can include layers of a protocol stack in the router 108 or other types of entities.

The process then determines (at 304), based on information of the packets from network entity A to network entity B, a packet maximal size of packets communicated from the network entity B to network entity A (in the reverse direction). As noted above, the information used to determine such packet maximal size can include acknowledgement numbers (or more generally index numbers) contained in the packets sent from network entity A to network entity B.

The packet maximal size (for the direction from network entity B to A) is estimated from multiple differences between multiple pairs of acknowledgment numbers in successive packets from network entity A to B. As an example, the following difference table lists various differences of acknowledgement numbers in successive packets in the direction 112 from network A to network entity B.

| Difference | Number of times difference appears in traffic |
|---|---|
| 2720 | 67 |
| 0 | 32 |
| 4096 | 5 |
| 4080 | 4 |
| 1360 | 4 |
| 5440 | 3 |
| 3408 | 3 |

In the example difference table above, the difference 2720 (in bytes or other amounts of data) appears 67 times, the difference 0 appears 32 times; the difference 4096 appears five times, the difference 4080 appears four times, and so forth. Note that the differences listed in the example difference table above can be the top differences (e.g. top predefined number of differences). There may be other differences that occur less frequently which are not listed in the example difference table above.

In some implementations, to estimate the packet maximal size of packets in the direction 110 from network entity B to network entity A, a greatest common divisor (GCD) is computed between each pair of two non-zero difference numbers in the example difference table above (excluding the difference of 0). The GCD of two or more non-zero integers is the largest positive integer that divides the non-zero integers without a remainder.

The example GCD table below identifies the GCDs between various pairs of non-zero differences in the example difference table above.

|  | 2720 | 4096 | 4080 | 1360 | 5440 | 3408 |
|---|---|---|---|---|---|---|
| 2720 |  | 32 | 1360 | 1360 | 2720 | 16 |
| 4096 |  |  | 16 | 16 | 64 | 16 |
| 4080 |  |  |  | 1360 | 1360 | 48 |
| 1360 |  |  |  |  | 1360 | 16 |
| 5440 |  |  |  |  |  | 16 |
| 3408 |  |  |  |  |  |  |
| 1494 |  |  |  |  |  |  |

In the example GCD table above, each of the non-zero differences is listed in both rows and columns of the table. As depicted in the first row, the GCD of the pair of numbers {2720, 4096} is 32. The GCD of {2720, 4080} is 1360, the GCD of {2720, 1360} is 1360, the GCD of {2720, 5440} is 2720, and the GCD of {2720, 3408} is 16. In the third row of the GCD table above, the GCD of {4080, 1360} is 1360, the GCD of {4080, 5440} is 1360, and the GCD of {4080, 3408} is 48. The other entries in the example GCD table represent other GCDs between other pairs of difference numbers.

In some examples, the largest value in the example GCD table that is less than 2000 is selected. In the example GCD table, such value is 1360. A reason for selecting 2000 as a cap in some implementations is that certain physical networks do not employ packet maximal sizes above 2000. However, in other examples, such a cap is not specified, and thus the largest value of 2720 in the example GCD table can be selected.

In the foregoing example, the packet maximal size can be estimated as 1360. This can be used as the MTU size in implementations where TCP is used. To calculate the TCP maximum segment size (MSS), the number 1360 is added to the number of bytes of various protocol headers, such as an Ethernet header, an IP header, and a TCP header. In such examples, the MSS based on selection of 1360 from the example GCD table is computed as 1360 plus 14 (bytes for the Ethernet header) plus 20 (bytes for the IP header) plus 20 (bytes for the TCP header), which equals 1414 bytes.

Although references made to using a GCD technique as discussed above for identifying an estimate of a packet maximal size based on differences between pairs of acknowledgement numbers, it is noted that other techniques for estimating the packet maximal size based on differences in acknowledgment numbers can be used in other implementations. Such techniques can be based on the observation that a difference between acknowledgement numbers in successive packets represents some multiple (1 or greater) of the packet maximal size. A divisor can then be computed for each pair of difference numbers, and one of the divisors that are computed in this manner based on multiple pairs of differences can be selected as an estimate for the packet maximal size.

Figure 3:
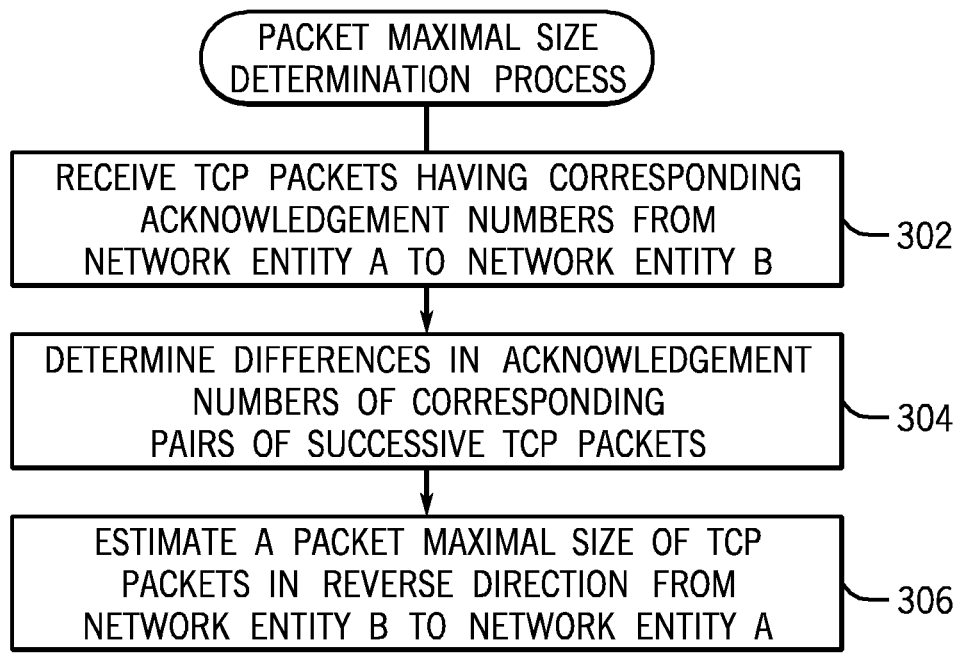

FIG. 3 is a flow diagram of a process according to further implementations which can also be performed by the packet maximal size determination module 114. The process of FIG. 3 receives (at 302) TCP packets (from network entity A to network entity B) having corresponding acknowledgment numbers. The process determines (at 304) differences in the acknowledgement numbers in corresponding pairs of successive TCP packets (from network entity A to B).

The process then estimates (at 306) a packet maximal size of TCP packets (in the reverse direction from network entity B to network entity A) based on the differences of acknowledgment numbers, such as by using the GCD technique discussed above.

Figure 4:
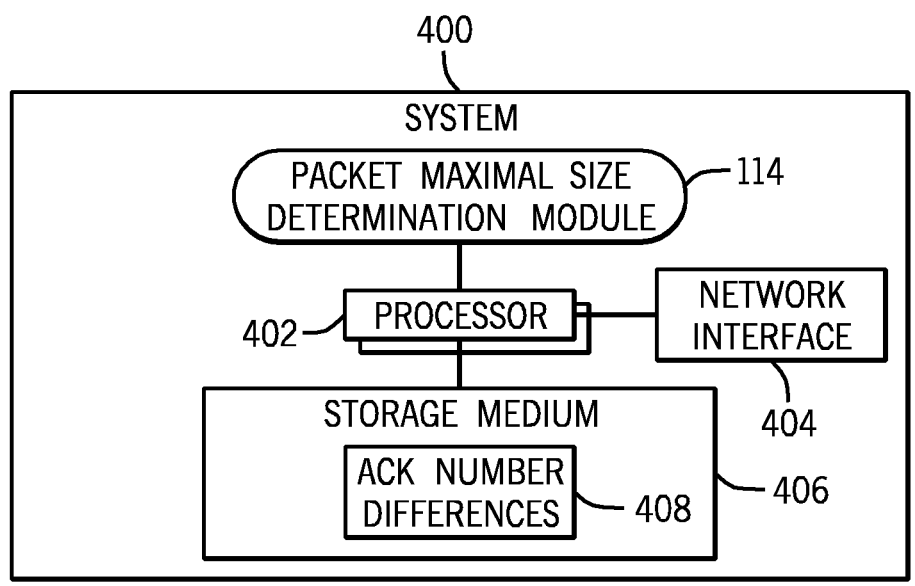
FIG. 4 is a block diagram of an example system that incorporates a packet maximal size determination module according to some implementations.

FIG. 4 is a block diagram of an example system 400 according to some implementations. The system 400 can include the packet maximal size determination module 114 of FIG. 1. In an implementation where the packet maximal size determination module 114 is implemented as machine-readable instructions, such machine-readable instructions are executable on one or multiple processors 402. A processor can include a microprocessor, microcontroller, processor module or subsystem, programmable integrated circuit, programmable gate array, or another control or computing device.

The processor(s) 402 can be connected to a network interface 404 to allow the system 400 to communicate over a network. Moreover the processor(s) 402 can be connected be a storage medium (or a storage media) 406 to allow storage of various information including differences 408 between acknowledgement numbers of successive packets.

The storage medium (or storage media) 406 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

The system 400 of FIG. 4 can be considered an example of a "processing device." Alternatively, a "processing device" can be considered a processor (or multiple processors) in the system 400. As further examples, the packet maximal size determination module 114 can be implemented as a hardware device, such as an application-specific integrated circuit (ASIC), programmable gate array, or other processing circuit. Such other hardware device can also be considered a "processing device."

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    receiving, by a processing device, packets communicated along a first network path from a first network entity to a second network entity, wherein the first network path is monitored by a network monitor;
    determining, by the processing device, a plurality of differences in data size from multiple pairs of acknowledgement numbers of successive packets of the received packets communicated along the first network path from the first network entity to the second network entity;
    computing, by the processing device, a plurality of greatest common divisors, including a greatest common divisor between each pair of numbers in the plurality of differences in data size between the multiple pairs of acknowledgement numbers;
    determining, by the processing device, a largest value from the plurality of greatest common divisors that represents a maximal size of a Transmission Control Protocol (TCP) packet to be communicated along a second network path from the second network entity to the first network entity; and
    causing the second network entity to send, to the first network entity, a given TCP packet that has a size that does not exceed the determined largest value, wherein the first network path is different than the second network path and the network monitor is unable to monitor traffic along the second network path.

2. The method of claim 1, wherein the acknowledgement numbers include TCP acknowledgement numbers.

3. The method of claim 1, wherein the determined largest value specifies an amount of data that is allowed in a given packet from the second network entity to the first network entity without resulting in fragmentation of the given packet that includes a header and a payload.

4. The method of claim 1, wherein determining the largest value comprises determining one of a TCP maximum segment size and a TCP maximum transmission unit size.

5. The method of claim 1, wherein the processing device is part of a router, the method further comprising:
    routing, by the router, the received packets from the first network entity to the second network entity.

6. An apparatus comprising:
    a processing device to:
    receive packets having corresponding acknowledgement numbers, the packets sent along a first network path from a first network device to a second network device over a network, the processing device unable to monitor packets along a second network path in a reverse direction from the second network device to the first network device;
    determine a plurality of differences in data size from multiple pairs of acknowledgement numbers of successive packets of the received packets communicated along the first network path from the first network entity to the second network entity;
    compute a plurality of greatest common divisors, including a greatest common divisor between each pair of numbers in the plurality of differences in data size between the multiple pairs of acknowledgement numbers;
    determine a largest value from the plurality of greatest common divisors that represents a maximal size of a Transmission Control Protocol (TCP) packet to be communicated along the second network path from the second network entity to the first network entity; and
    cause the second network entity to send, to the first network entity, a given TCP packet that has a size that does not exceed the determined largest value.

7. The apparatus of claim 6, wherein the maximal size is one of a Transmission Control Protocol maximum segment size or maximum transmission unit size.

8. The apparatus of claim 6, wherein the acknowledgement numbers are for acknowledging sequence numbers in packets.

9. The apparatus of claim 6, comprising a router that comprises the processing device, wherein the router is to route the received packets from the first network device to the second network device, wherein the estimated maximal size specifies an maximum amount of data that is allowed in a given TCP packet from the second network device to the first network device, without resulting in fragmentation of the given TCP packet.

10. An article comprising at least one non-transitory machine-readable storage medium storing instructions that upon execution cause a processing device to:
   receive packets communicated along a first network path from a first network entity to a second network entity over a network in a first direction, wherein the first network path is monitored by a network monitor;
   determine a plurality of differences in data size from multiple pairs of acknowledgement numbers of successive packets of the received packets communicated along the first network path from the first network entity to the second network entity;
   compute a plurality of greatest common divisors, including a greatest common divisor between each pair of numbers in the plurality of differences in data size between the multiple pairs of acknowledgement numbers;
   determine a largest value from the plurality of greatest common divisors that represents a maximal size of a Transmission Control Protocol (TCP) packet to be communicated along a second network path from the second network entity to the first network entity; and
   cause the second network entity to send, to the first network entity in a second direction different from the first direction, a given TCP packet that has a size that does not exceed the determined largest value, wherein the network monitor is unable to monitor traffic along the second network path.

11. The article of claim 10, wherein determining the largest value based on the acknowledgement numbers includes determining the largest value based on TCP acknowledgement numbers in the packets from the first network entity to the second network entity.

12. The article of claim 10, wherein the processing device is part of a router, and wherein the instructions upon execution cause the processing device in the router to route the received packets from the first network entity to the second network entity.

* * * * *